(12) United States Patent
Kamath et al.

(10) Patent No.: US 6,970,838 B1
(45) Date of Patent: Nov. 29, 2005

(54) METHODS AND SYSTEMS FOR ONLINE EXPRESS ORDERING OF GOODS AND SERVICES

(75) Inventors: Sudesh Kamath, Foster City, CA (US); Tyson Hom, Danville, CA (US); Allen Lee, Daly City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 766 days.

(21) Appl. No.: 09/645,460

(22) Filed: Aug. 24, 2000

(51) Int. Cl.[7] .............................................. G06F 17/60
(52) U.S. Cl. .............................. 705/26; 705/7; 705/37; 705/80; 700/14; 700/16; 700/19; 707/6
(58) Field of Search .............................. 705/26, 37, 29, 705/1, 39; 340/5.2

(56) References Cited

U.S. PATENT DOCUMENTS

| | | | | |
|---|---|---|---|---|
| 5,870,719 | A | * | 2/1999 | Maritzen et al. ............... 705/26 |
| 5,960,411 | A | | 9/1999 | Hartman et al. |
| 5,963,953 | A | * | 10/1999 | Cram et al. .................. 707/102 |
| 6,064,982 | A | * | 5/2000 | Puri ............................. 705/27 |
| 6,167,383 | A | * | 12/2000 | Henson ........................ 705/26 |
| 6,629,079 | B1 | * | 9/2003 | Spiegel et al. ................. 705/26 |

FOREIGN PATENT DOCUMENTS

| | | | | |
|---|---|---|---|---|
| WO | WO 99/21076 | * | 4/1999 | ............. G06F 3/00 |

OTHER PUBLICATIONS

Wilson, T. "SpaceWorks Upgrade Gets Orders in Oder—Version 4.2 Offers Quote Management And Customer Surveys" InternetWeek (Dec. 6, 1999).*
"FlexiInternational Software adds Inventory & Order entry to its suite of products" Business Wire (Oct. 15, 1996).*
"Arrow adds weapon on online arsenal" Electronic Buyer's News (Nov. 8, 1999).*

* cited by examiner

*Primary Examiner*—Wynn W. Coggins
*Assistant Examiner*—Timothy M. Brown
(74) *Attorney, Agent, or Firm*—Young Law Firm, P.C.

(57) ABSTRACT

A method of processing an online purchase request from a customer includes steps of receiving a first online purchase request for a first item; retrieving pre-stored information about the customer and generating a first quote that includes an identification of the first item and the retrieved information. Modifications may be made to the first quote, which lasts at least until a consolidation interval has elapsed. The first quote is converted to a first executable order for the first item when a quote conversion process determines that the first quote has remained unmodified at least for the consolidation interval. A second online purchase request for a second item may be added to the first quote when the second online purchase request is received before the first quote is converted into the first order or when the first quote has remained unmodified for a period of time that is less than the consolidation interval. A second quote may be generated when the quote conversion process determines that the first quote has remained unmodified for a period of time greater than the consolidation interval. The quote conversion process may run continuously or may be launched at a selectable interval. The consolidation interval may be measured, for example, from the time at which the quote conversion process is launched.

45 Claims, 6 Drawing Sheets

METHODS AND SYSTEMS FOR ONLINE EXPRESS ORDERING OF GOODS AND SERVICES

BACKGROUND OF THE INVENTION

1. Field of the Invention

The present invention relates generally to the computer-implemented methods and systems for ordering goods and services online (over the Internet, using the World Wide Web, for example). More particularly, the present invention relates to methods and systems for streamlining up the ordering process while affording the customer and/or sales representatives the flexibility of modifying or canceling the order after the initial commitment to order the product has been made.

2. Description of the Related Art

Electronic commerce over the World Wide Web (hereafter, "Web") is now well established. Many consumers now routinely make purchases from Web vendors for such diverse items as books, music, groceries, consumer electronics and clothes, to name a few. Although great strides have been made to make the online experience simple, secure and convenient, much progress is still needed if online shopping is to gain universal acceptance.

Typically, shoppers point their Web browsers to a Web vendor's Web site and select items for purchase. The shopping cart metaphor has proven to be particularly effective in making the online shopping experience more intuitive and less intimidating. Web sites that use such a shopping cart metaphor invite shoppers to add their selections to their shopping cart before proceeding to the actual purchase, or checkout. If the customer has previously registered with the Web vendor, the Web vendor may already have a record of all of the shipping, billing and payment instrument information needed for the customer and the Web vendor to conclude the purchase. Methods are also known that do not rely upon such a shopping cart model. In such methods, a customer that has previously registered with the Web vendor may purchase their selections using only a single or a few clicks of a pointing device (a mouse, for example), such as disclosed in U.S. Pat. No. 5,960,411. However, such methods may not allow the customer or any other authorized persons to modify their order after it is placed. For example, there may be instances in which a customer may want to add or subtract items from their order before the order is sent to the order fulfillment system (hereafter OFS). There may be other instances in which a customer may have changed their mind and wish to cancel their order shortly after having placed it. It is also conceivable that a sales agent or representative may want to modify an order placed by a customer. For example, a portion of the order may be incompatible with the other items of the order, as is frequently the case with the purchase of computer peripherals, for example. The sales representative may also want to modify a customer order if he or she knows of a special promotion that would lower the purchase price of the items ordered, for example. Alternatively, the customer may want to change the ship to or bill to address of a recently placed order, or may want to change the payment instrument information, such as substituting one credit card for another, for example. There are many other reasons why a customer or other persons may want to modify or cancel a recently placed online order. However, it is not believed that the currently implemented methods afford either the customer or any other authorized person the ability to modify an order after the commitment to purchase has been made. In brick and mortar stores, customers may changes their mind before they leave the store and need only turn around, walk back to the cash register and return or exchange the purchased item. Online customers, however, are not afforded like conveniences and may be left feeling somewhat less than fully satisfied with the transaction.

What are needed, therefore, are methods and systems for streamlining the online ordering process while affording the customer and/or other authorized persons the convenience of modifying or canceling the order after the initial commitment to order the product has been made.

SUMMARY OF THE INVENTION

It is, therefore, an object of the present invention to provide methods and systems for streamlining up the online ordering process while affording the customer and/or other authorized persons the convenience of modifying or canceling the order after the initial commitment to order the product has been made.

In accordance with the above-described objects and those that will be mentioned and will become apparent below, a method of processing an online purchase request from a customer, according to the present invention, may comprise steps of receiving a first online purchase request for a first item; retrieving pre-stored information about the customer; generating a first quote that includes an identification of the first item and the retrieved information; allowing modifications to be made to the first quote, the first quote lasting at least until a consolidation interval has elapsed, and converting the first quote to a first executable order when a quote conversion process determines that the first quote has remained unmodified at least for the consolidation interval.

According to further embodiments of the present invention, the received purchase request may include a click of a pointing device coupled to a client computer device. The quote generating step may include a step of generating an order status Web page that is viewable by the customer, the order status Web page displaying selected details of the first quote. The order status Web page may be configured to refer to the first quote as a pending order. The allowing step may allow the customer, a selected process and/or one or more authorized persons to modify the first quote. The authorized person(s) may include the customer and/or a sales representative, for example. The quote conversion process may be launched at a selectable interval or may run continuously and the consolidation interval may be measured from the time at which the quote conversion process is launched. A step of sending the first executable order to an order fulfillment system may also be carried out.

Steps of receiving a second online purchase request for a second item from the customer, and adding the second item to the first quote when the second online purchase request is received before the first quote is converted into the first order may also be carried out. The method may also include steps of receiving a second online purchase request for a second item from the customer, and adding the second item to the first quote when the quote conversion process determines that the first quote has remained unmodified for a period of time that is less than the consolidation interval. Alternatively still, the method may further include steps of receiving a second online purchase request for a second item from the customer, and generating a second quote that includes an identification of the second item and the retrieved information when the quote conversion process determines that the first quote has remained unmodified for a period of time greater than the consolidation interval. The quote conversion process may determine the difference between the time at which a last modification to the first quote was made and the current time and may convert the quote to the first order when the difference is greater than the consolidation interval. A step of sending an email to the customer may be carried out when the first quote is converted into the first order.

The present invention is also a computer system configured for processing a customer purchase request, including at least one processor; at least one data storage device; a plurality of processes spawned by the at least one processor, the processes including processing logic for carrying out the above-detailed steps.

The present invention may also be viewed as a machine-readable medium having data stored thereon representing sequences of instructions which, when executed by computing device, causes the computing device to process a customer purchase request by performing the above-detailed steps.

DESCRIPTION OF THE INVENTION

Functional Description

Figure 1:
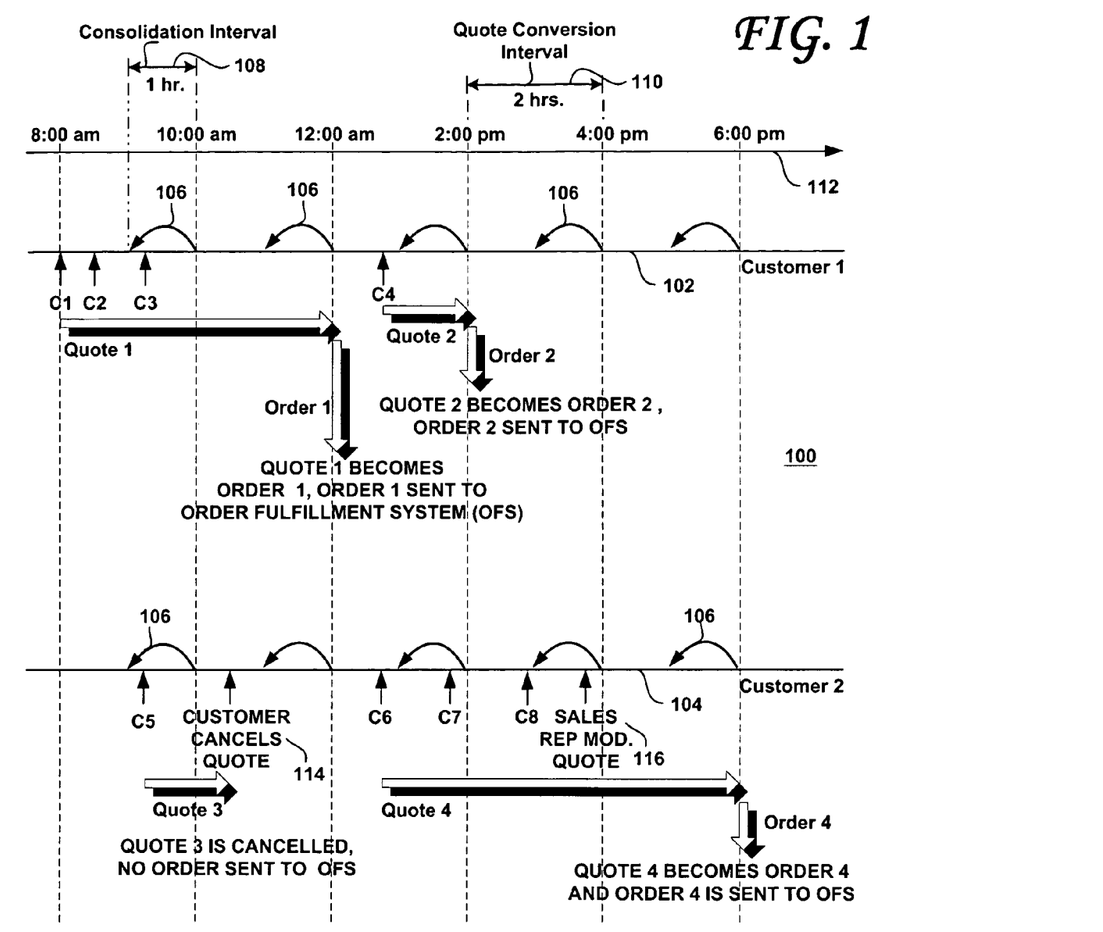
FIG. 1 is a timeline, showing the progression of a customer order, from selection of goods and/or services, through the creation of a quote to the generation of an executable order, according to an embodiment of the present invention.

FIG. 1 is a timeline, showing the progression of an online customer order for goods and/or services, from selection of the goods and/or services, through the creation of a quote to the generation of an executable order, according to an embodiment of the present invention. The timeline 100 of FIG. 1 shows a first customer at 102 and a second customer at 104. Shown at 112 is the time of day, from 8:00 am to 6:00 pm. It is to be understood that the present invention is applicable to any number of concurrent customers and to any time of the day, the customers 102, 104 and the 8:00 am to 6:00 pm timeline being shown in FIG. 1 as an illustrative example only. The vertical arrows labeled C1 through C8 denote an action by the customer, such as clicks of a pointing device (clicks of a mouse, for example). Specifically, C1 through C8 represent purchase requests, by which the customers 102, 104 have selected goods and/or services for online purchase and have indicated their willingness to be bound by the terms of the sale and to purchase the goods and/or services. According to the present invention, such purchase requests C1 through C8 may occur when the Customer 102, 104 clicks on an "Express Order" button, as will be more fully developed below.

Turning first to Customer 102 (also shown at 202 in FIG. 2), a first purchase request C1 is received by the Web vendor (shown at 204 in FIG. 2) at 8:00 am. For simplicity's sake, it will be assumed herein that each of the purchase requests C1 through C8 is a request for purchase of a single item. For illustrative purposes only, it will be assumed that C1 is a request by Customer 1 for purchase of a first item at 8:00 am, C2 is a purchase request by Customer 1 for purchase of a second item at about 8:30 am, C3 is a request by Customer 1 for purchase of third item at about 9:15 am and C4 is a request for purchase of a fourth item or service at about 12:45 pm.

Figure 2:
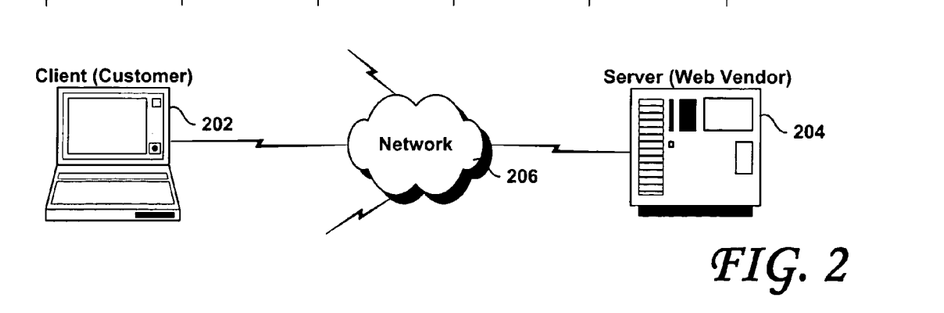
FIG. 2 is an illustration of a Web vendor and a customer coupled to a computer network, according to the present invention.
Figure 6:
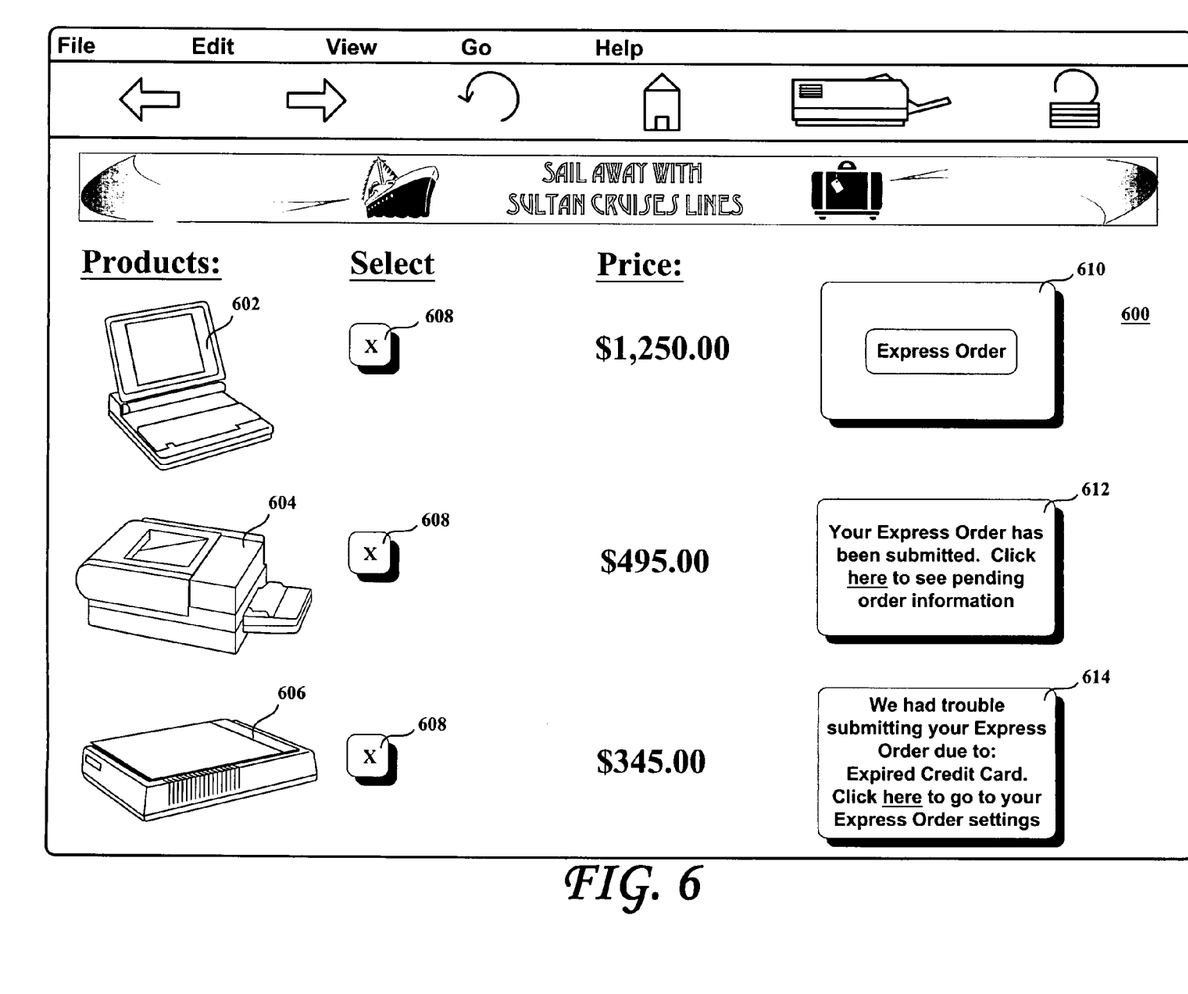
FIG. 6 is an illustration of a Web page in which the customer selects goods for purchase using the method for Express Ordering according to the present invention.

The method of processing an online purchase request from a customer, according to an embodiment of the present invention, may include the steps of receiving a first online purchase request C1 for purchase of a first item. The term "item", according to the present invention, includes any goods or services, whether purchased individually or in combination. For example, C1 may denote Customer 1 requesting the purchase of a single item or may denote, for example, a combined purchase request for several items, such as a laptop computer 602, a printer 604 and a scanner 606, as shown in FIG. 6. According to the present invention and as shown in FIG. 2, the receiving step may be carried out by a Web vendor's server 204, whereas the purchase requests C1–C8 may be initiated by one or more client computer devices 202. The client and server computer devices 202, 204 may be coupled via a computer network 206 that may include, for example, the Internet. Returning now to FIG. 1, in response to purchase request C1, the Web vendor's server 204 may retrieve pre-stored information about the customer. Such pre-stored information may include all information that may be necessary to process the customer's purchase request, including the customer's name, address, payment instrument information (credit card information, for example), billing address, shipping address, etc. According to the present invention, when a customer makes a purchase request, as Customer 1 has done at 8:00 am at C1, an executable order (an order for goods and/or services that is ready to be sent to an order fulfillment system) may not immediately be generated. Instead, a quote is generated that includes all information necessary to process an executable order for the selected items. The information included in a quote, therefore, includes at least an identification of the goods and/or services to be purchased and the retrieved customer information. As shown in FIG. 1, Quote 1 is generated upon Customer 1 making the purchase request C1. Quotes, according to the present invention, are not immediately converted into an executable order. Instead, quotes persist for a period of time to allow the customer, other authorized persons and/or a selected automated process or processes to add further items to the generated quote, subtract items therefrom, cancel the quote or to generally modify any or selected payment, shipping and/or billing parameters. From the customer's point of view, however, the quote may appear as through it is an executable order, in that the customer may be given a confirmation of his or her order, via a link to a Web page generated for the customer for that purpose. The persistence of the quote, as shown at FIG. 1 is shown by the shadowed horizontal arrows. For example, Quote 1 is generated upon Customer 1 making the purchase request C1 and lasts for a period of time. According to the present invention, quotes last at least until a consolidation interval 108 has elapsed. The consolidation interval is a selectable parameter (i.e., the consolidation interval 108 may be set by the Web vendor) and represents a minimum period of time during which the quote will remain in existence or will remain valid. In the example shown in FIG. 1, the consolidation interval 108 has been set to one hour, although other values therefor may be freely selected. As shown in FIG. 1, the consolidation interval 108 is a minimum period of time during which a quote remains valid. Indeed, Quote 1 remains valid until 12:00 pm, fully four hours after it was generated. In contrast, purchase request C4 generates a quote (Quote 2) at about 12:45 and a corresponding executable Order 2 is generated at 2:00 pm. In either case, Quotes 1 and 2 remained valid for at least the consolidation interval. The consolidation interval 108, according to an embodiment of the present invention is that selectable interval during which a customer may add items to an existing quote, subtract items therefrom or otherwise modify the quote. Immediately after the consolidation interval 108 or at some time thereafter the quote will be converted to an executable order that may be sent to an order fulfillment system, unless previously cancelled by the customer or other authorized person. Specifically, the present invention calls for a quote conversion process to convert the quote to an executable order when the quote conversion process (a concurrently running asynchronous program or daemon, for example) determines that the quote has remained unmodified for at least the consolidation interval 108.

According to the present invention, the quote conversion process may run continuously. If the quote conversion process runs continuously, quotes may be converted into corresponding executable orders that may be sent to an order fulfillment system as soon as the consolidation interval 108 set by the Web vendor elapses after generation of the quote. Alternatively, the quote conversion process may be configured to be launched at a (Web vendor-) selectable time interval. In the example of FIG. 1, the selectable time interval at which the quote conversion process is launched is 2 hours, as shown by the dashed vertical lines at 8:00 am, 10:00 am, 12:00 pm, 2:00 pm, 4:00 pm and 6:00 pm. Therefore, according to the present invention, the quote conversion process is launched at a selectable interval (every two hours in the example of FIG. 1) and converts all existing quotes that have remained unmodified at least for the consolidation interval 108 (1 hour in the example of FIG. 1) into corresponding executable orders. As shown in FIG. 1, the quote conversion process is launched once at 8:00 am and finds no quotes that have been unmodified for at least the consolidation period of 1 hour, as indicated by the curved arrows 106. Indeed, during the time interval between 8:00 am and 10:00 am, Quote 1 has been modified twice; once at C2 at about 8:30 am and another time at C3 at about 9:15 am. According to an embodiment of the present invention, purchase requests (such as C2 and C3) occurring before an existing quote (such as Quote 1) for that same customer (such as Customer 1) is converted into an executable order (Order 1) may be automatically consolidated with the existing quote (such as Quote 1). Alternatively, the customer may be given the ability to decide whether additional purchase requests that occur before an existing quote for that same customer is converted into an executable order should be consolidated with the existing quote. In FIG. 1, it is assumed that the purchase requests C2 and C3 are consolidated (e.g., added) to existing Quote 1. These additional purchase requests C2 and C3 are consolidated with Quote 1, as the purchase request C2 was received at about 8:30 am, which is within the consolidation interval 108 (1 hour in the example of FIG. 1), as measured from the time of launch of the quote conversion process. Likewise, purchase request C3 was consolidated with Quote 1, as C3 operates to modify Quote 1 within the consolidation interval 108, as measured from the time of launch of the quote conversion process, as indicated by the arrow 106 from 10:00 am to 9:00 am.

Customer 1, as shown at FIG. 1, does not make further purchase requests after C3 until about 12:45 pm. Therefore, when the quote conversion process is again launched at 12:00 pm, the quote conversion process determines that Quote 1 has indeed remained unmodified for at least the consolidation interval 108 (it has remained unmodified since C3 at about 10:15 am) and converts Quote 1 into an executable order (Order 1) that may be sent to an order fulfillment system (not shown) for processing and execution (debiting of the payment from customer's designated payment instrument, packaging and shipping of the item(s) selected for purchase).

At about 12:45 pm, Customer 1 again makes a purchase request, as shown at C4. As Quote 1 has been converted into Order 1, purchase request C4 may not be consolidated therewith. Instead, a second quote (Quote 2) is generated, as Customer 1 no longer has a pending quote. Quote 2 is shorter-lived than Quote 1, as the quote conversion process (launched at 2:00 pm) determines that Quote 2 has remained unmodified for at least the quote consolidation interval 108 (in this case, about 15 minutes longer than the illustrative quote consolidation interval 108 of one hour). Therefore, at or around 2:00 pm, Quote 2 is converted into an executable order (Order 2) that may be sent to an order fulfillment system.

Reference is now made to Customer 2, to illustrate other purchase request scenarios according to the present invention. Customer 2 makes a first purchase request C5 at about 8:45 am. Therefore, a quote (Quote 3) is generated at or around that time. According to the present invention, modifications may be made to Quote 3 until it is converted to an executable order by the quote conversion process. However, as shown at about 10:30 am, Customer 2 changes his or her mind and cancels his or her "order". Quote 3 may appear to the customer as an order, even though it is not yet an executable order. The advantage of initially treating a customer purchase request as a quote and not as an executable order is that the customer or other authorized persons may modify or cancel the quote for a selectable period of time. In this case, Customer 2 has decided to cancel their "order", which operates to cancel Quote 3. Accordingly, the quote conversion process that is launched at 12:00 pm finds no quote to convert to an executable order. Thus, Quote 3 is never converted into an executable order and no order corresponding to Quote 3 is ever sent to the order fulfillment system. Later on, the same Customer 2 makes a purchase request C6 at around 12:45 pm, thereby causing the generation of a new Quote 4 that includes at least an identification of the item to be purchased and the information that is retrieved from the Web vendor's server 204 for that customer. The quote conversion process that is launched at 2:00 pm finds that Quote 4 has been modified during the consolidation interval 108, as measured from the time of launch of the quote conversion process. Indeed, Customer 2 has somehow modified Quote 4 by means of C7 (which occurred at about 1:45 pm), may have added an item to Quote 4, subtracted an item therefrom or otherwise changed some of the customer, payment, shipping and/or billing information for that quote. Quote 4, therefore, persists past the 2:00 pm launch of the quote conversion process. Another purchase request C8 occurs close to 3:00 pm, further modifying Quote 4. C8 is consolidated with Quote 4, because Quote 4 has not yet been converted to an executable order, even through Quote 4 has remained unmodified for a period of time that is greater than the consolidation interval 108. At about 3:45 pm, a sales representative or other authorized person modifies Quote 4. This may occur because the sales representative may have reviewed the pending quote and determined that the customer qualifies for a price break or other special promotion, for example. Many other situations may be imagined in which a sales representative or other authorized person may legitimately modify a customer's pending quote. At 4:00 pm, the quote conversion process is again launched, and determines that Quote 4 has not remained unmodified for a period of time at least equal to the consolidation period 108. Therefore, Quote 4 persists and is not, at that time, converted into a corresponding executable order. Quote 4, in the example shown in FIG. 1 remains unmodified until 6:00 pm, at which time the quote conversion process is again launched and determines that Quote 4 has in fact remained unmodified for at least the consolidation interval 108 and converts Quote 4 into executable order 4, which may now be sent to an order fulfillment system for processing and execution of the customer's purchase request.

Figure 3:
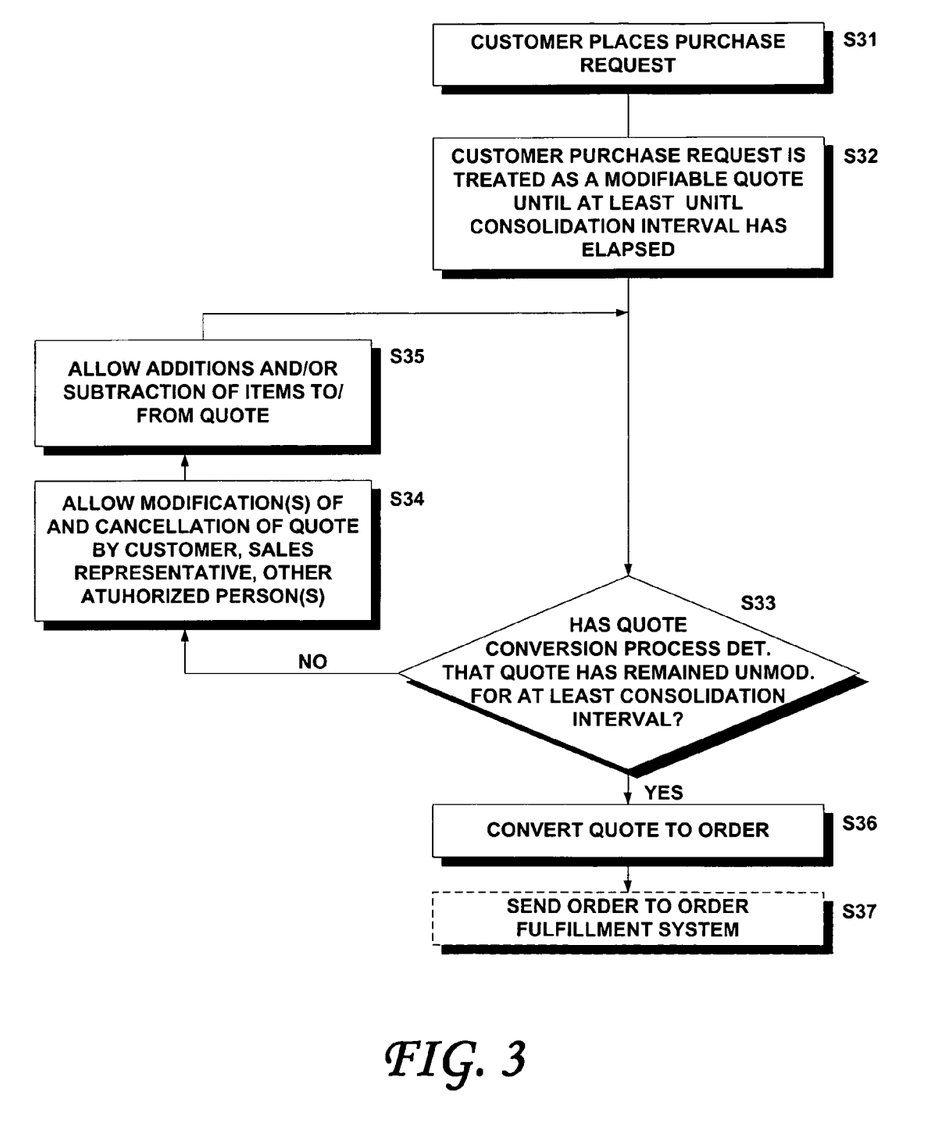
FIG. 3 is a flowchart illustrating an embodiment of the present invention.

FIG. 3 is a flowchart illustrating an embodiment of the present invention. As shown therein, step S31 calls for the customer to place a purchase request, as shown at C1, C4, C5 and C6 in FIG. 1. As shown at S32, the customer's purchase request is treated as a modifiable quote (which is generated at that time) at least until the consolidation interval has elapsed. In step S33, it is determined whether the quote conversion process has determined that the quote generated in step S32 has remained unmodified for at least the consolidation interval 108. If the quote generated in step S32 has not remained unmodified for at least the consolidation interval 108, step S34 may be carried out. Step S34 allows modification(s) and/or cancellation of quote by the customer, sales representative and/or any other authorized person(s). Such modifications may include the addition and/or subtraction of items from the quote, as shown at S35, or may include other modifications, such as changing the shipping and/or billing addresses, for example. Step S33 may then be repeated until the quote conversion process determines that the quote has remained unmodified for at least the consolidation interval 108. After the quote conversion process determines that the quote has indeed remained unmodified for at least the consolidation interval 108, the quote may be converted into an executable order, as shown at S36. The timing of the determination of step S33 may vary widely, depending upon whether the quote conversion process runs continuously or at a selectable interval, as shown at FIG. 1. An optional step S37 may then be carried out, in which the executable order is sent to an order fulfillment system.

Figure 4:
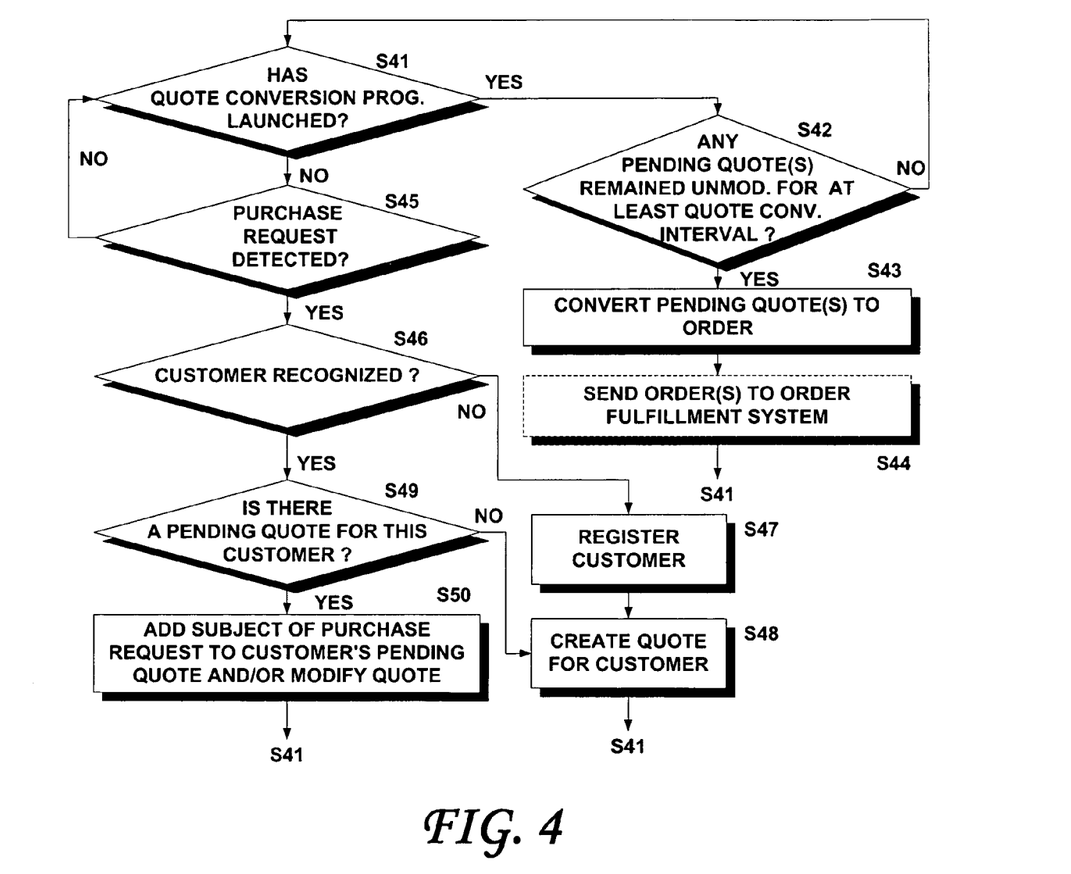
FIG. 4 is a flowchart illustrating another embodiment of the present invention.

FIG. 4 is a flowchart illustrating another embodiment of the present invention. As shown therein, step S41 determines whether the quote conversion program has launched. If the quote conversion process has launched (as shown in the example of FIG. 1 at 8:00 am and every two hours thereafter), the quote conversion process determines whether any pending quotes exist that have remained unmodified for at least the quote conversion interval 108. If no pending quotes exist or if none of the pending quotes have remained unmodified for at least the quote conversion interval 108, the method reverts to step S41. If a quote or quotes exist that have remained unmodified for at least the quote conversion interval 108, they are converted to executable orders, as shown in S43 and optionally sent to an order fulfillment system, as shown at S44. If the quote conversion process has not launched, (NO branch of S41), it is determined whether a purchase request has been detected, as shown at S45. If not, the method may revert back to S41. If, however, a purchase request has been detected, it is determined in step S46 whether the customer having made the purchase request (clicked on an Express Order button, for example) is recognized (i.e., is a repeat user whose profile, payment instrument, shipping and/or billing information is stored in the Web vendor's server, for example). If the customer is not recognized, the customer may be registered in step S47, meaning that the customer's information may be collected and stored, as detailed, for example, relative to FIG. 5 below. After collecting the customer's information, a quote for the customer may now be created, including at least the information collected and stored in S47, as well as an identification of the item or items selected by the customer through his or her purchase request detected in S45. The method may now revert back to step S41. If the customer having made the purchase request is indeed recognized by the Web vendor's server (or other appropriate system), the YES branch of step S46 leads to a determination of whether there is a pending quote for this customer, as shown at S49. Referring back to FIG. 1, purchase requests C2 and C3, for example, are made during the existence of a pending quote (Quote 1). If the customer is recognized and no pending quote exists for the recognized customer, the method may proceed to step S48, whereupon a quote is created for that customer. If a pending quote exists for the recognized customer, the subject of the customer's purchase request may be added to the pending quote and/or the pending quote may be modified, as outlined in step S50. The method may then revert back to step S41.

Figure 5:
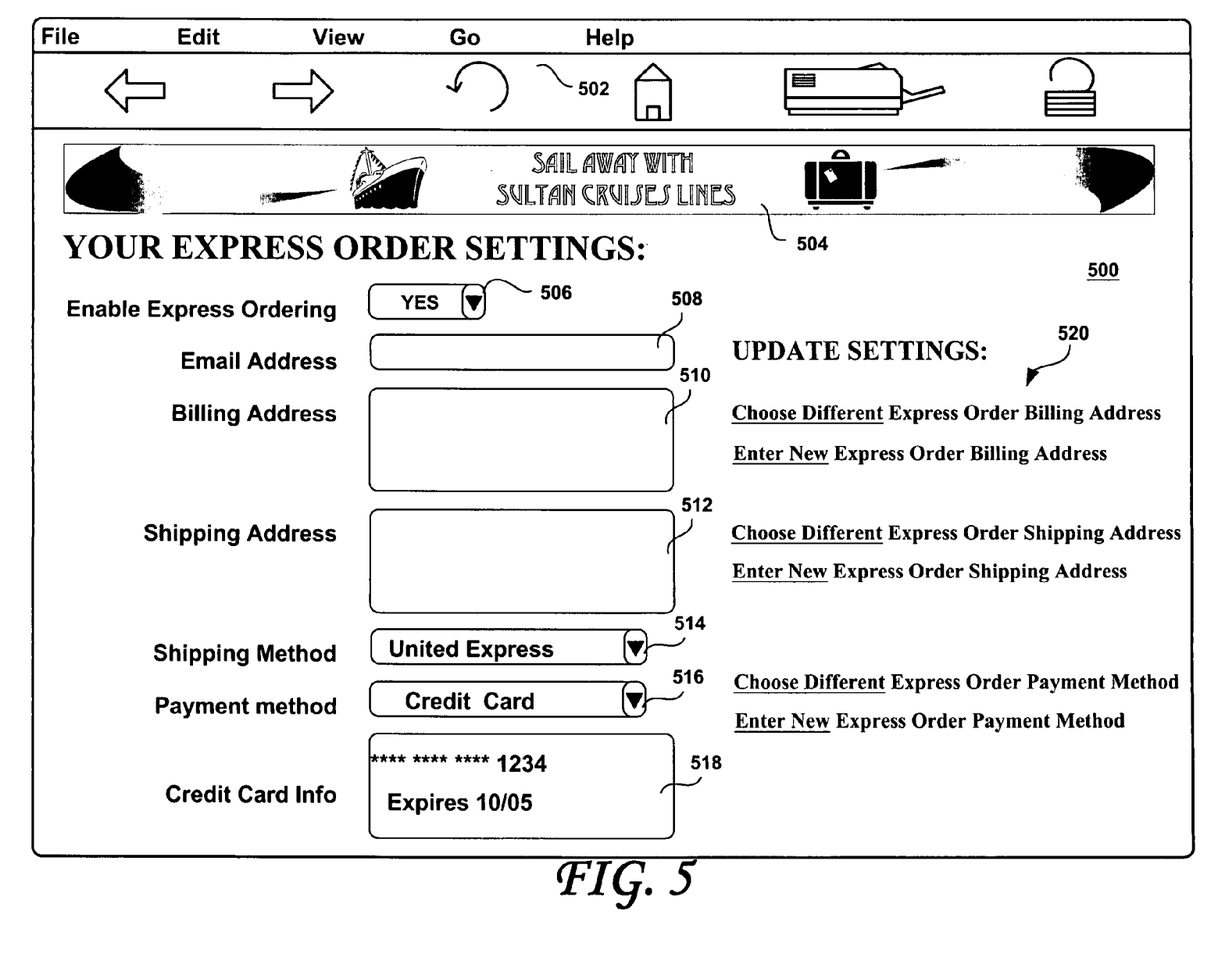
FIG. 5 is an illustration of a screen in which the customer inputs his or her Express Order settings, according to an embodiment of the present invention.

If the customer having made a purchase request is not recognized (see S46 in FIG. 4), the customer may be prompted to enter his or her information via a Web page 500 similar to that depicted in FIG. 5. As shown therein, the Web page 500 may be rendered using a Web browser 502, such as Netscape Communications' Navigator, for example. An advertising banner (a fictitious example of which is shown at 504) or other commercial message may be caused to appear on the Web page 500. The Web page 500 allows a customer to enter or modify his or her Express Order settings, by which the customer may cause an executable order to be generated using only a single action, such as a mouse click, for example. Reference numeral 506 denotes a drop down menu that allows the customer to enable or disable Express Ordering according to the present invention. Form input fields 508, 510 and 512 enable the customer to enter an email address, billing address and shipping address, respectively. The shipping method may also be specified using a drop down menu, as shown at 514. At 516 and 518, the customer may be prompted to enter his or her payment instrument information, such as credit card, debit card, direct transfer, check and/or other forms of electronic money. Web page 500 also allows the customer to change or update any of the above-listed fields at 520, to enable a particular purchase to be billed to a different credit card or shipped to a different address, for example.

FIG. 6 is an illustration of a Web page 600 in which the customer selects items for purchase using the Express Order method according to the present invention. As shown therein, a customer may select to purchase different items for purchase, such as a laptop computer 602, printer 604 and/or scanner 606, for example. By clicking or otherwise selecting the select check box 608 and selecting the Express Order button 610, the customer may express order the selected items 602, 604 and/or 606. Clicking or otherwise selecting the Express Order (or similarly-labeled) button causes the steps detailed above relative to FIGS. 1 through 5 according to the present invention to occur, from the generation of a quote to the eventual generation of an executable order. If the customer selects an item (such as shown at 602, 604 and 606, for example) and clicks on the Express Order button 610, the customer may order the selected items with only a single mouse click (or other appropriate action from some other pointer device). Indeed, if the customer does not add to, subtract from and/or otherwise modify the quote that is generated after the Express Order button 610 is clicked, the quote will be converted to an executable order after the quote has remained unmodified for a period of time at least equal to the quote conversion interval 108 shown in FIG. 1. The executable order may then be submitted to an order fulfillment system (not shown) for execution without any further action from the customer. As shown in FIG. 6, after the customer has clicked on the Express Order button 610, one of the notices 612 or 614 may appear. Notice 612 inform the customer that their Express Order has been submitted, and provides a hyperlink (the underlined word here) to another Web page (not shown) that details the current "order" and the status thereof. From the customer's point of view, an order has been submitted. However, according to the present invention, the customer's "order", until it is converted into an executable order, is but a quote that may be modified and that may be converted into an executable order at some time in the future. When and if the quote is converted to an order, an email message may be automatically generated and sent to the email address specified at 508 in FIG. 5. If the quote cannot be processed, a notice such as shown at 614 may appear in the Web page 600. The reason for the inability to process the quote may be listed, along with a hyperlink (the underlined word here) to another Web page, such as the Express Order settings Web page 500 of FIG. 5.

Hardware Description

Figure 7:
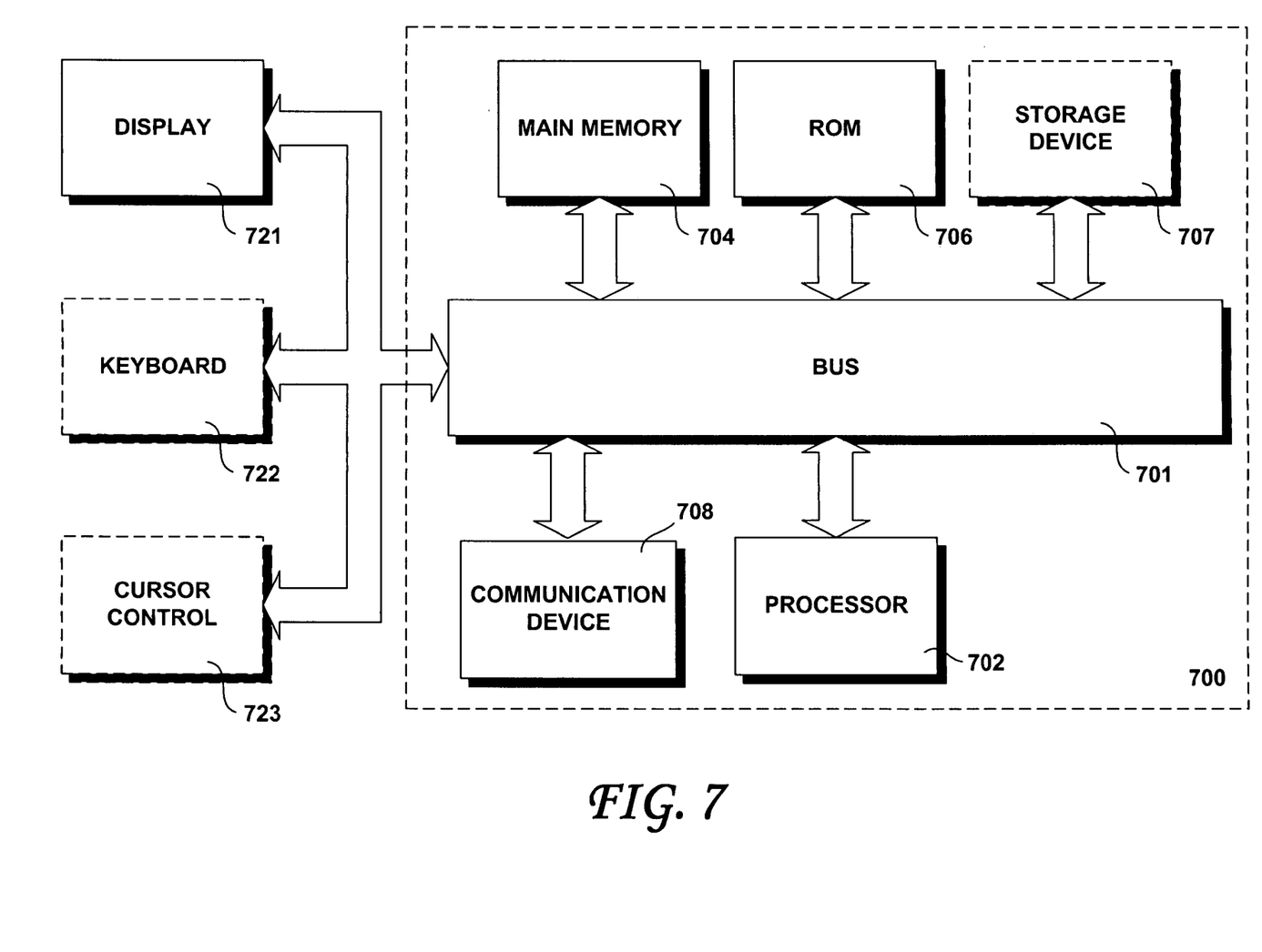
FIG. 7 is a block diagram of a computer system with which the present invention may be implemented.

FIG. 7 illustrates a block diagram of a computing device 700 with which an embodiment of the present invention may be implemented. Examples of such computing devices are shown at reference numeral 202 and 204 in FIG. 2. Computing device 700 includes a bus 701 or other communication mechanism for communicating information, and a processor 702 coupled with bus 701 for processing information. Computing device 700 further comprises a random access memory (RAM) or other dynamic storage device 704 (referred to as main memory), coupled to bus 701 for storing information and instructions to be executed by processor 702. Main memory 704 also may be used for storing temporary variables or other intermediate information during execution of instructions by processor 702. Computing device 700 may also include a read only memory (ROM) and/or other static storage device 706 coupled to bus 701 for storing static information and instructions for processor 702. A data storage device 707, such as a magnetic disk or optical disk, may be coupled to bus 701 for storing information and instructions. A communication device 708, such as a modem or network (such as Ethernet, for example) card is also coupled to the bus 701 to provide access to a network, such as shown at 206 in FIG. 2.

The computing device 700 may also be coupled via bus 701 to a display device 721, such as a cathode ray tube (CRT), for displaying information to a computer user. An alphanumeric input device 722, including alphanumeric and other keys, is typically coupled to bus 701 for communicating information and command selections to processor 702. Another type of user input device may be user's own voice or cursor control 723, such as a mouse, a trackball, or cursor direction keys for communicating direction information and command selections to processor 702 and for controlling cursor movement on display 721.

The present invention is related to the use of computing device 700 to process a customer purchase request. According to one embodiment, the processing may be carried out by one or more computing devices 700 in response to processor(s) 702 executing sequences of instructions contained in memory 704. Such instructions may be read into memory 704 from another computer-readable medium, such as data storage device 707 and/or from a remotely located server. Execution of the sequences of instructions contained in memory 704 causes processor(s) 702 to implement the cart sharing functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method of processing a purchase request from a customer over a computer network, comprising the steps of:
   receiving a first online purchase request for a first item over the computer network;
   retrieving pre-stored information about the customer from a database of customer information;
   generating a first quote that includes an identification of the first item and the retrieved information;
   allowing modifications to be made to the first quote, the first quote lasting at least until a consolidation interval has elapsed, and
   launching a quote conversion process, the quote conversion process being configured to determine whether the first quote has remained unmodified at least for the consolidation interval;
   converting the first quote to a first executable order responsive to the launching step when the quote conversion process determines that the first quote has remained unmodified at least for the consolidation interval.

2. The method of claim 1, wherein the received purchase request includes a click of a pointing device coupled to a client computer device.

3. The method of claim 1, wherein the quote generating step includes a step of generating an order status Web page that is viewable by the customer, the order status Web page displaying selected details of the first quote.

4. The method of claim 3, wherein the order status Web page is configured to refer to the first quote as a pending order.

5. The method of claim 1, wherein the allowing step allows at least one of the customer, a selected process and at least one authorized person to modify the first quote.

6. The method of claim 5, wherein the at least one authorized person includes the customer and a sales representative.

7. The method of claim 1, wherein the quote conversion process is launched at a selectable interval.

8. The method of claim 7, wherein the consolidation interval is measured from a time at which the quote conversion process is launched.

9. The method of claim 1, wherein the quote conversion process runs continuously.

10. The method of claim 1, further comprising the step of sending the first executable order to an order fulfillment system.

11. The method of claim 1, further comprising the steps of:
receiving a second online purchase request for a second item from the customer, and
adding the second item to the first quote when the second online purchase request is received before the first quote is converted into the first order.

12. The method of claim 1, further comprising the steps of:
receiving a second online purchase request for a second item from the customer, and
adding the second item to the first quote when the quote conversion process determines that the first quote has remained unmodified for a period of time that is less than the consolidation interval.

13. The method of claim 1, further comprising the steps of:
receiving a second online purchase request for a second item from the customer, and
generating a second quote that includes an identification of the second item and the retrieved information when the quote conversion process determines that the first quote has remained unmodified for a period of time greater than the consolidation interval.

14. The method of claim 1, wherein the quote conversion process determines a difference between a time at which a last modification to the first quote was made and a current time and converts the quote to the first order when the difference is greater than the consolidation interval.

15. The method of claim 1, further comprising the step of sending an email to the customer when the first quote is converted into the first order.

16. A computer system configured for processing a customer purchase request over a computer network, comprising:
at least one processor;
at least one data storage device coupled to said at least one processor;
a plurality of processes spawned and executed by said at least one processor, the processes including processing logic for:
receiving a first online purchase request for a first item over the computer network;
retrieving pre-stored information about the customer from a database of customer information;
generating a first quote that includes an identification of the first item and the retrieved information;
allowing modifications to be made to the first quote, the first quote lasting at least until a consolidation interval has elapsed, and
launching a quote conversion process, the quote conversion process being configured to determine whether the first quote has remained unmodified at least for the consolidation interval;
converting the first quote to a first executable order responsive to the launching step when the quote conversion process determines that the first quote has remained unmodified at least for the consolidation interval.

17. The computer system of claim 16, wherein the received purchase request includes a click of a pointing device coupled to a client computer device.

18. The computer system of claim 16, wherein the quote generating step includes a step of generating an order status Web page that is viewable by the customer, the order status Web page displaying selected details of the first quote.

19. The computer system of claim 18, wherein the order status Web page is configured to refer to the first quote as a pending order.

20. The computer system of claim 16, wherein the allowing step allows at least one of the customer, a selected process and at least one authorized person to modify the first quote.

21. The computer system of claim 20, wherein the at least one authorized person includes the customer and a sales representative.

22. The computer system of claim 16, wherein the quote conversion process is launched at a selectable interval.

23. The computer system of claim 22, wherein the consolidation interval is measured from a time at which the quote conversion process is launched.

24. The computer system of claim 16, wherein the quote conversion process runs continuously.

25. The computer system of claim 16, further comprising the step of sending the first executable order to an order fulfillment system.

26. The computer system of claim 16, further comprising the steps of:
receiving a second online purchase request for a second item from the customer, and
adding the second item to the first quote when the second online purchase request is received before the first quote is converted into the first order.

27. The computer system of claim 16, further comprising the steps of:
receiving a second online purchase request for a second item from the customer, and
adding the second item to the first quote when the quote conversion process determines that the first quote has remained unmodified for a period of time that is less than the consolidation interval.

28. The computer system of claim 16, further comprising the steps of:
receiving a second online purchase request for a second item from the customer, and
generating a second quote that includes an identification of the second item and the retrieved information when the quote conversion process determines that the first quote has remained unmodified for a period of time greater than the consolidation interval.

29. The computer system of claim 16, wherein the quote conversion process determines a difference between a time at which a last modification to the first quote was made and a current time and converts the quote to the first order when the difference is greater than the consolidation interval.

30. The computer system of claim 16, further comprising the step of sending an email to the customer when the first quote is converted into the first order.

31. A machine-readable medium having data stored thereon representing sequences of instructions which, when executed by computing device, causes said computing device to process a customer purchase request over a computer network by performing the steps of:
 receiving a first online purchase request for a first item over the computer network;
 retrieving pre-stored information about the customer from a database of customer information;
 generating a first quote that includes an identification of the first item and the retrieved information;
 allowing modifications to be made to the first quote, the first quote lasting at least until a consolidation interval has elapsed;
 launching a quote conversion process, the quote conversion process being configured to determine whether the first quote has remained unmodified at least for the consolidation interval;
 converting the first quote to a first executable order responsive to the launching step when the quote conversion process determines that the first quote has remained unmodified at least for the consolidation interval.

32. The machine-readable medium of claim 31, wherein the received purchase request includes a click of a pointing device coupled to a client computer device.

33. The machine-readable medium of claim 31, wherein the quote generating step includes a step of generating an order status Web page that is viewable by the customer, the order status Web page displaying selected details of the first quote.

34. The machine-readable medium of claim 33, wherein the order status Web page is configured to refer to the first quote as a pending order.

35. The machine-readable medium of claim 31, wherein the allowing step allows at least one of the customer, a selected process and at least one authorized person to modify the first quote.

36. The machine-readable medium of claim 35, wherein the at least one authorized person includes the customer and a sales representative.

37. The machine-readable medium of claim 31, wherein the quote conversion process is launched at a selectable interval.

38. The machine-readable medium of claim 37, wherein the consolidation interval is measured from a time at which the quote conversion process is launched.

39. The machine-readable medium of claim 31, wherein the quote conversion process runs continuously.

40. The machine-readable medium of claim 31, further comprising the step of sending the first executable order to an order fulfillment system.

41. The machine-readable medium of claim 31, further comprising the steps of:
 receiving a second online purchase request for a second item from the customer, and
 adding the second item to the first quote when the second online purchase request is received before the first quote is converted into the first order.

42. The machine-readable medium of claim 31, further comprising the steps of:
 receiving a second online purchase request for a second item from the customer, and
 adding the second item to the first quote when the quote conversion process determines that the first quote has remained unmodified for a period of time that is less than the consolidation interval.

43. The machine-readable medium of claim 31, further comprising the steps of:
 receiving a second online purchase request for a second item from the customer, and
 generating a second quote that includes an identification of the second item and the retrieved information when the quote conversion process determines that the first quote has remained unmodified for a period of time greater than the consolidation interval.

44. The machine-readable medium of claim 31, wherein the quote conversion process determines a difference between a time at which a last modification to the first quote was made and a current time and converts the quote to the first order when the difference is greater than the consolidation interval.

45. The machine-readable medium of claim 31, further comprising the step of sending an email to the customer when the first quote is converted into the first order.

* * * * *

UNITED STATES PATENT AND TRADEMARK OFFICE
CERTIFICATE OF CORRECTION

PATENT NO.     : 6,970,838 B1
DATED          : November 29, 2005
INVENTOR(S)    : Sudesh Kamath, Tyson Hom and Allen Lee It is certified that error appears in the above-identified patent and that said Letters Patent is hereby corrected as shown below:

Title page,
Item [56], References Cited, U.S. PATENT DOCUMENTS, add:
-- 4,958,368 *     9/1990     Parker, Terry S.     379/91.01
   5,655,088 *     8/1997     Midorikawa et al.    705/37 --.
OTHER PUBLICATIONS, add:
-- Software buyers' guide" Purchasing, Vol. 118, on. 8 (May 18, 1995) p. 59 * --.
"Wilson T." reference, replace "Oder" with -- Order --.
"Arrow adds weapon on online arsenal" reference, replace "on" with -- to --.

Signed and Sealed this

Twenty-fourth Day of January, 2006

JON W. DUDAS
*Director of the United States Patent and Trademark Office*